July 2, 1946.  T. B. FARRINGTON ET AL  2,403,355
LAMP SUPPORTING MEANS
Filed April 21, 1944    10 Sheets-Sheet 1
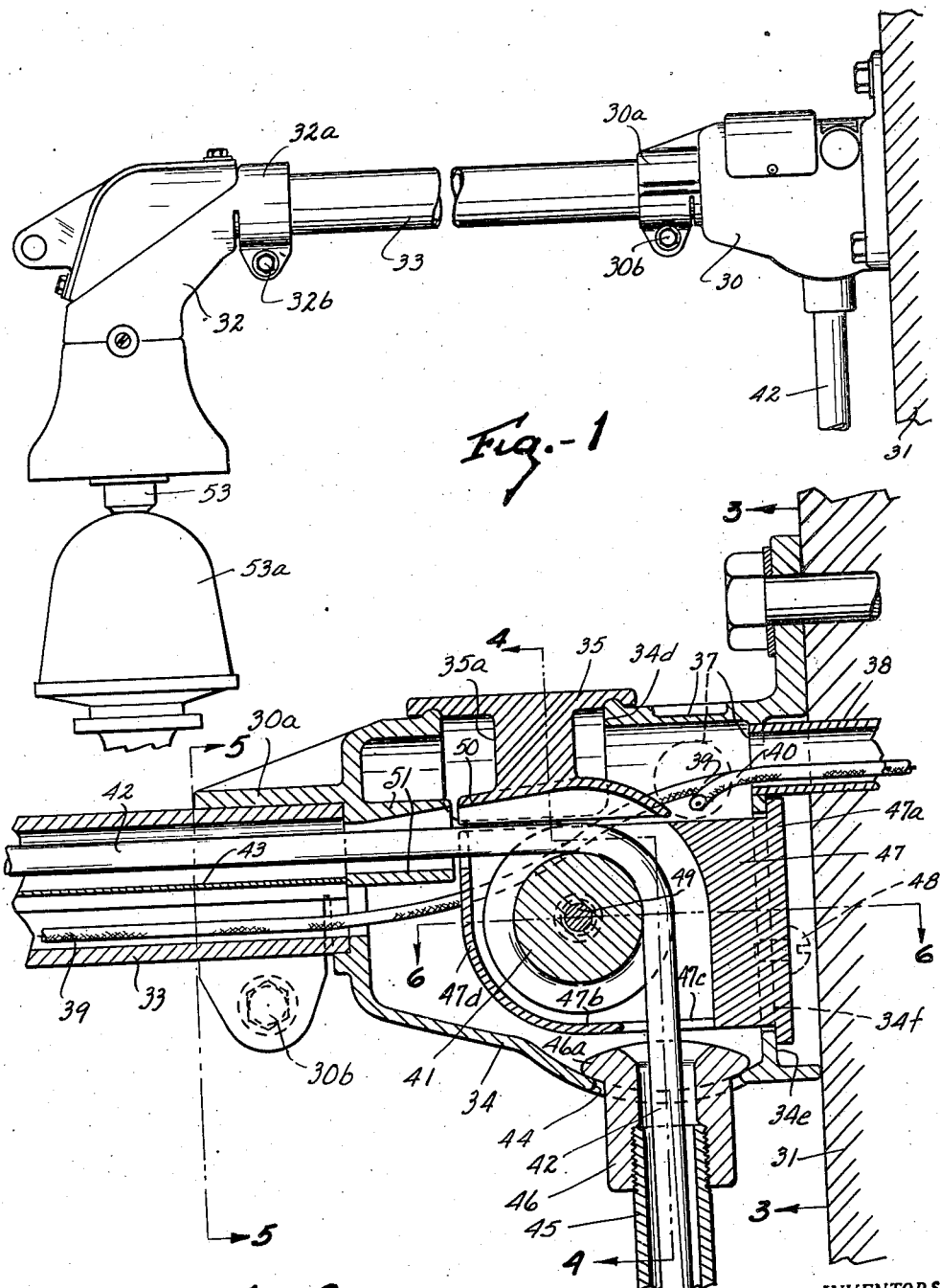
INVENTORS
THAYER B. FARRINGTON
WADE T. KELLER
ROBERT K. FARRINGTON
BY Hyde and Meyer
ATTORNEYS

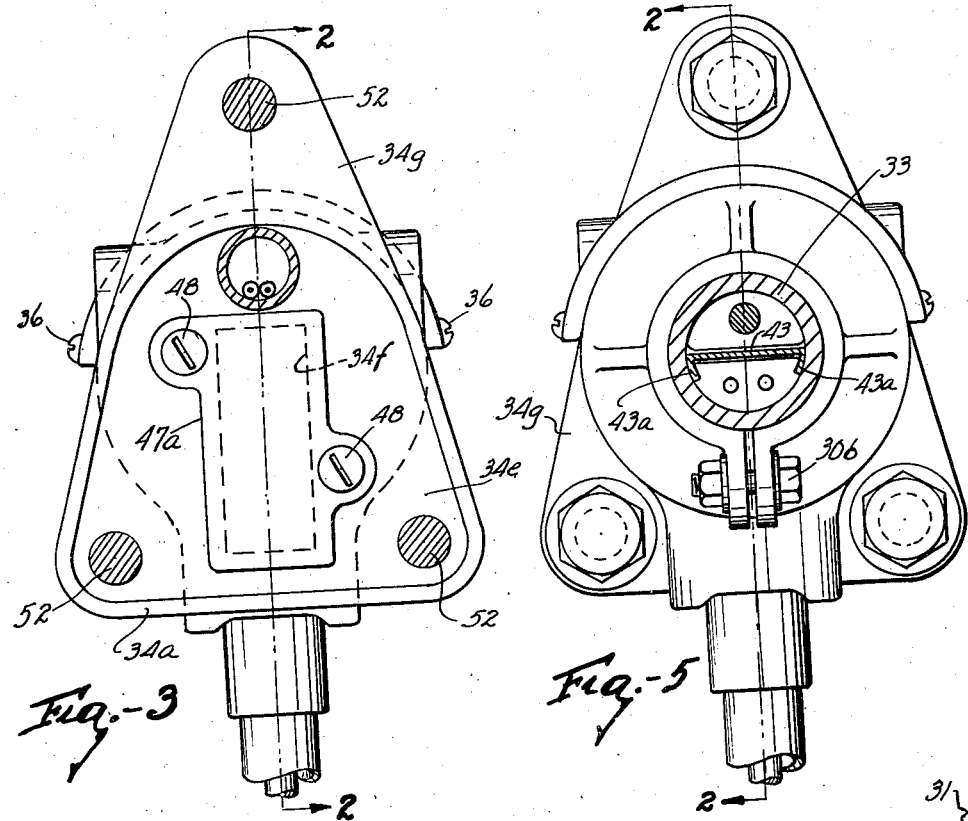

July 2, 1946.   T. B. FARRINGTON ET AL   2,403,355
LAMP SUPPORTING MEANS
Filed April 21, 1944   10 Sheets-Sheet 3

INVENTORS
THAYER B. FARRINGTON
WADE T. KELLER
ROBERT K. FARRINGTON
BY Hyde and Meyer
ATTORNEYS

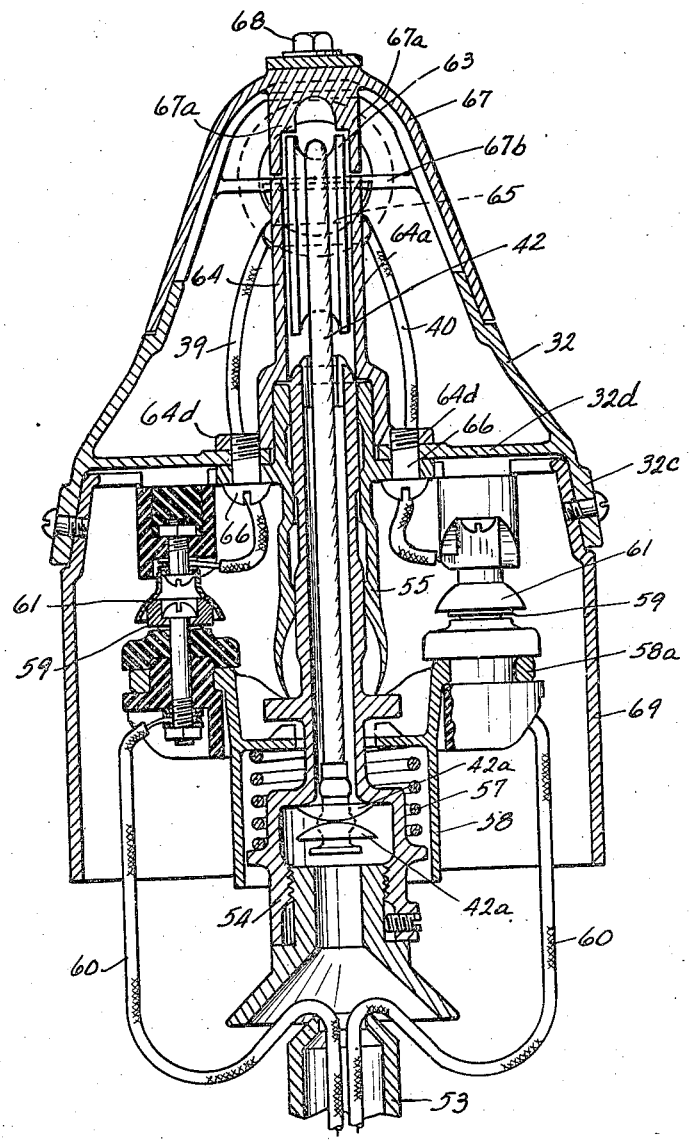

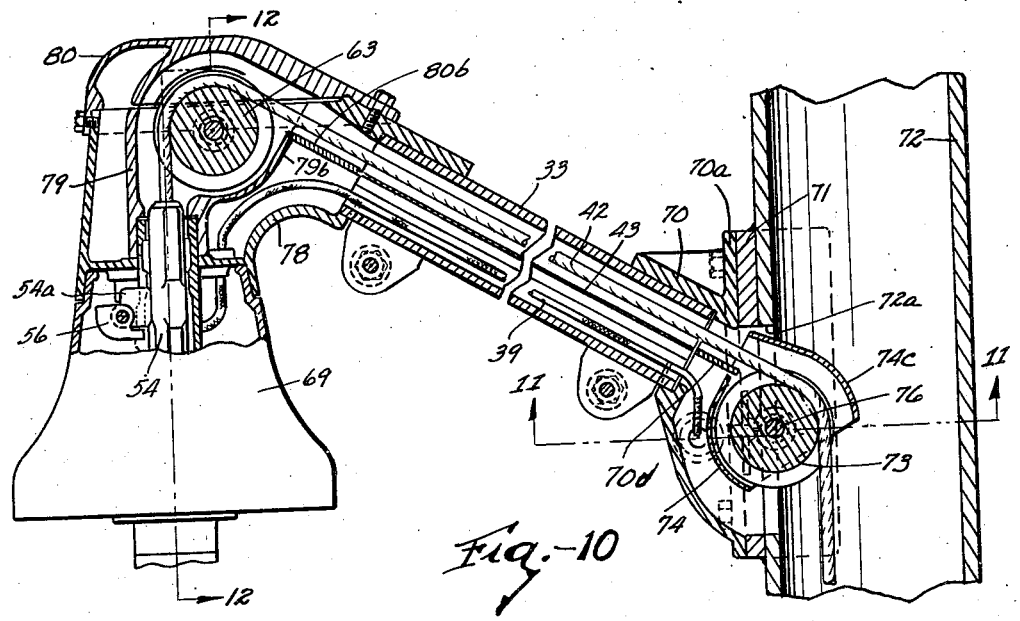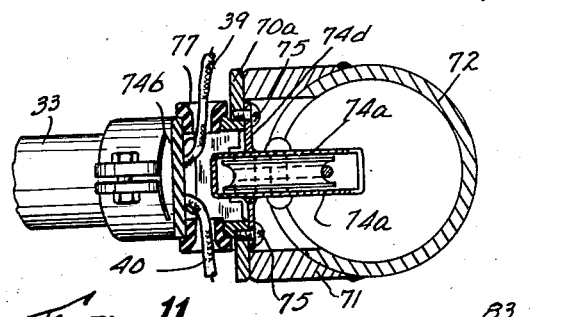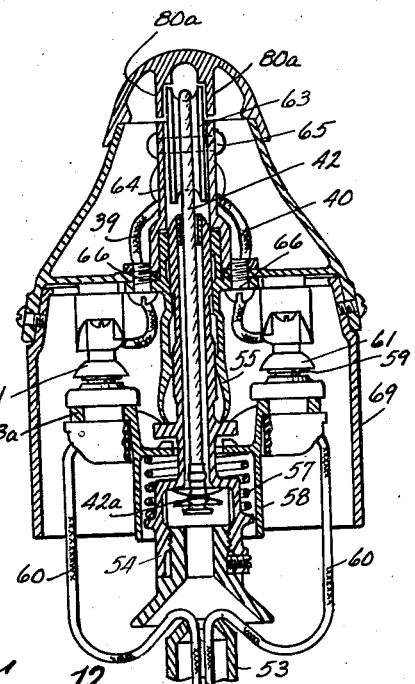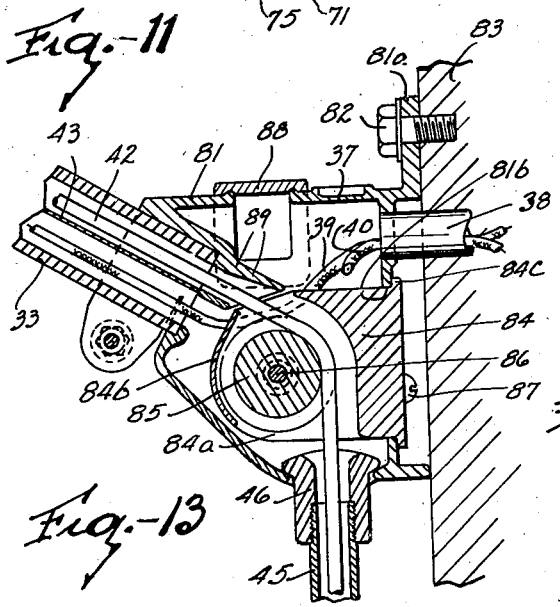

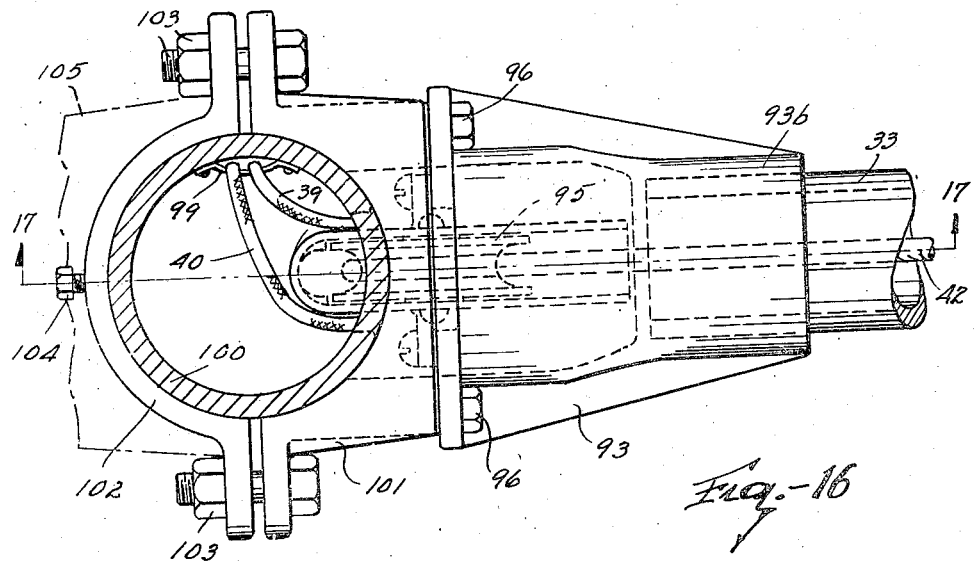
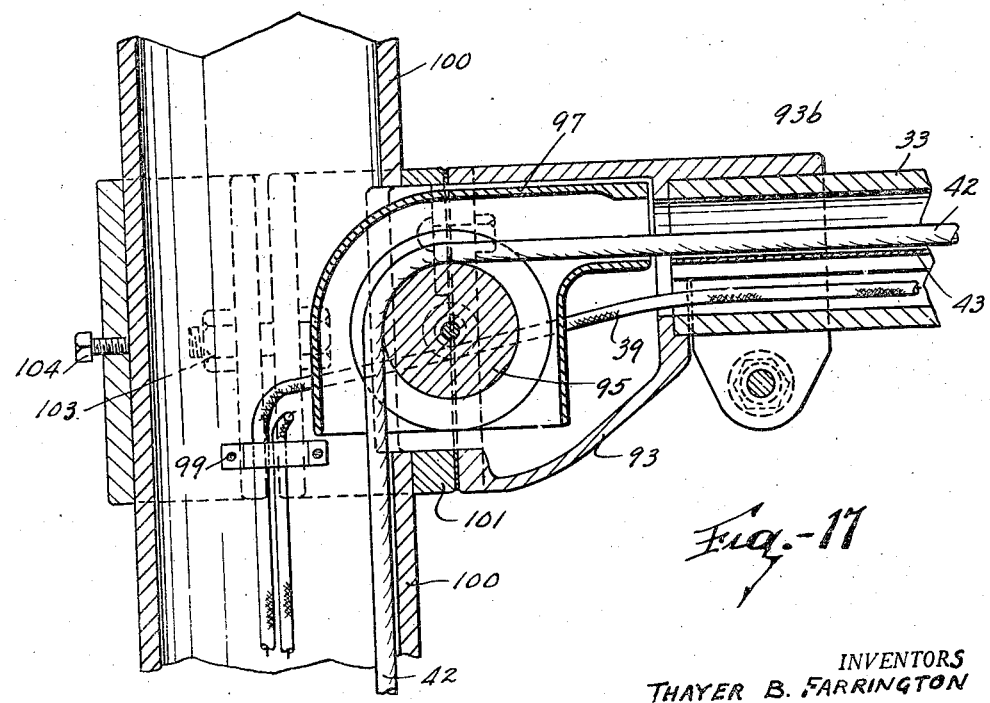

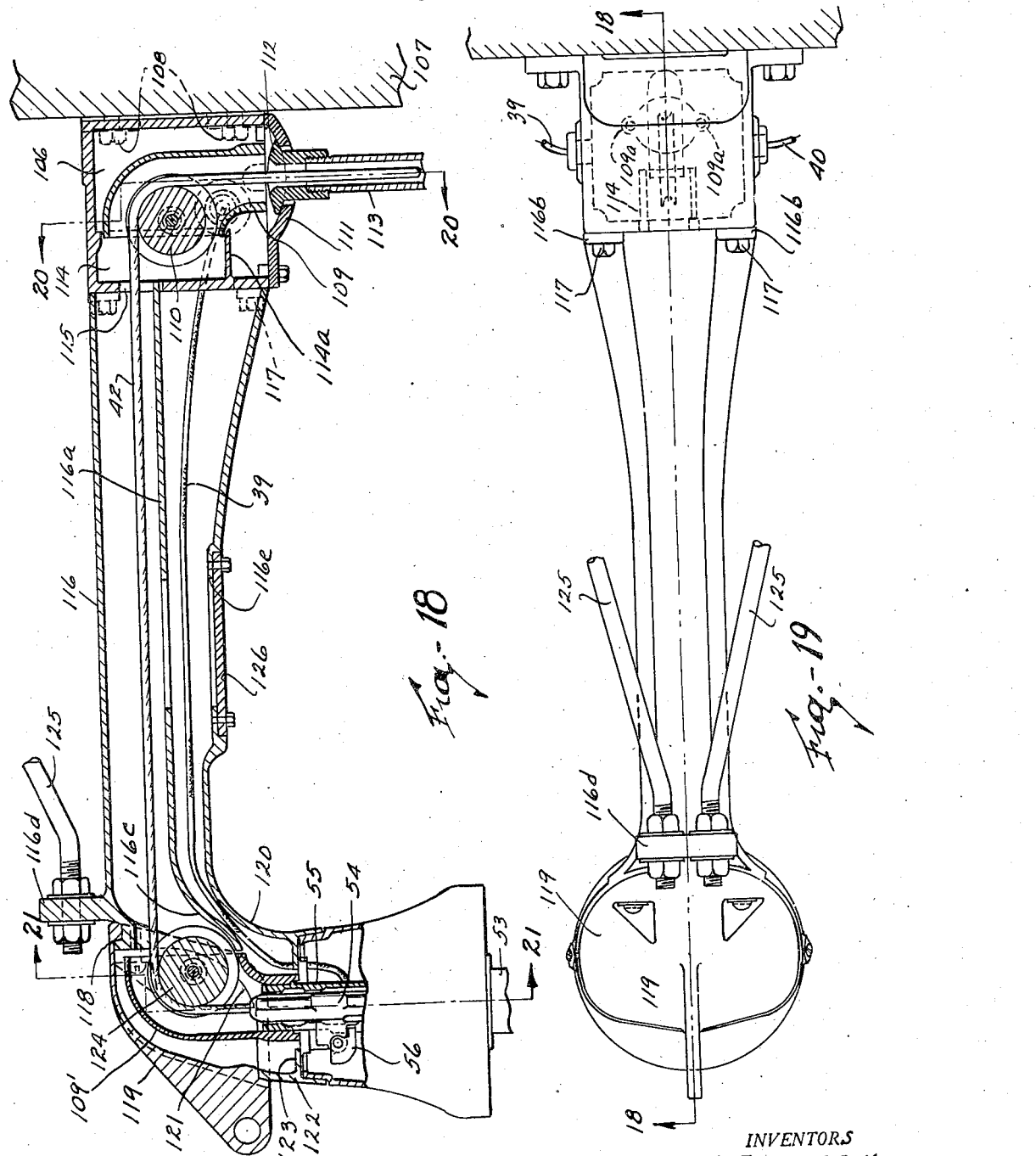

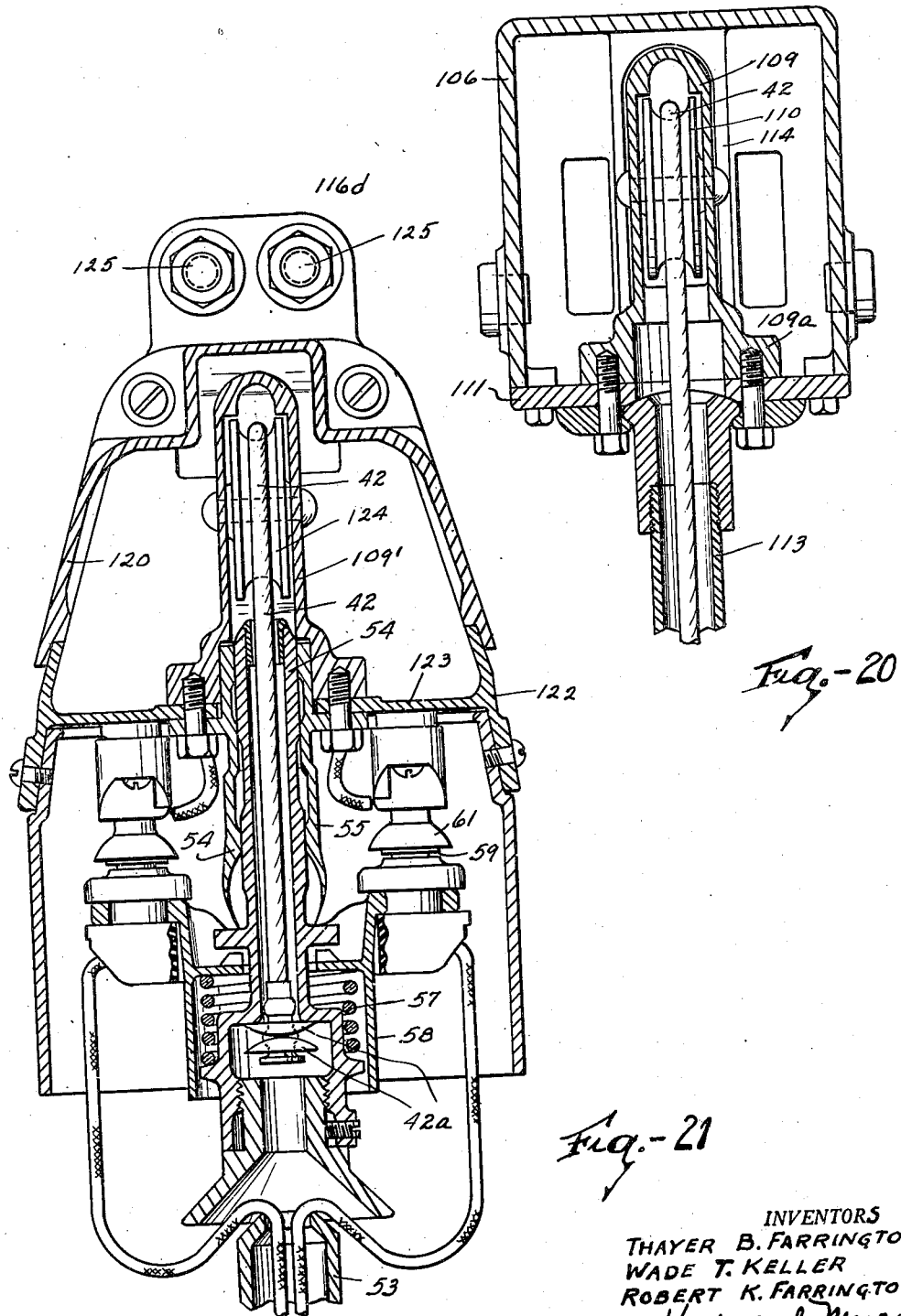

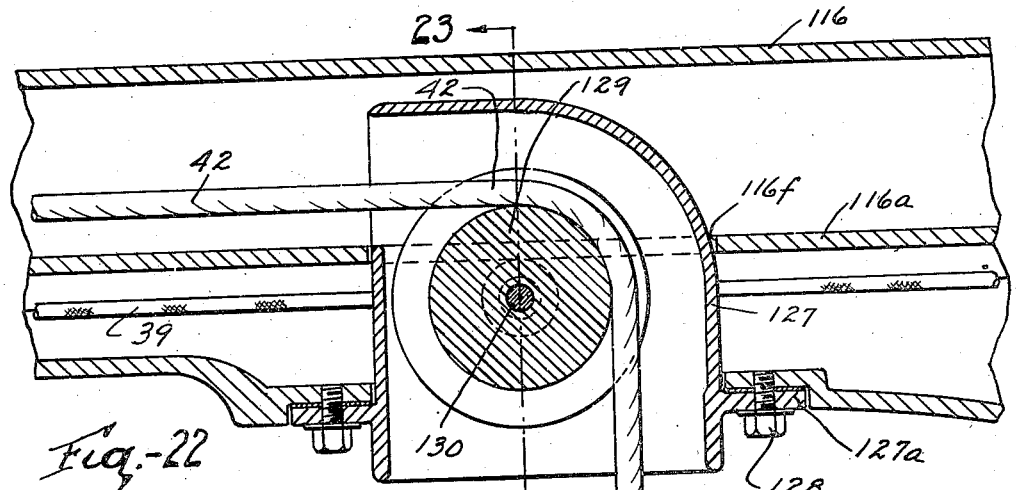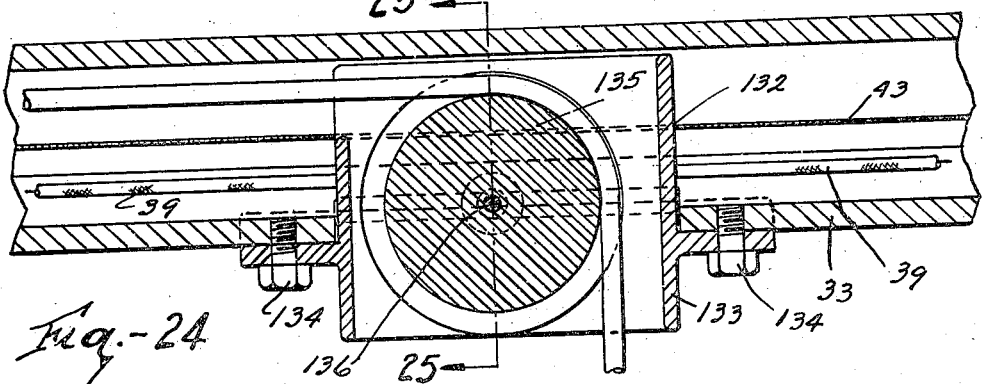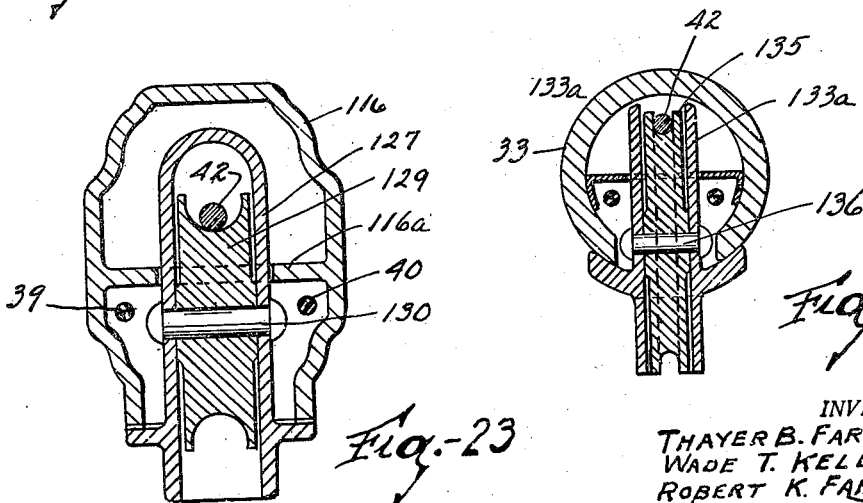

Patented July 2, 1946

2,403,355

UNITED STATES PATENT OFFICE 2,403,355

LAMP SUPPORTING MEANS

Thayer B. Farrington, Cleveland Heights, Wade T. Keller, Cleveland, and Robert K. Farrington, Cleveland Heights, Ohio, assignors to The Thompson Electric Company, Cleveland, Ohio, a corporation of Ohio Application April 21, 1944, Serial No. 532,116

7 Claims. (Cl. 248—320)

This invention relates to an improved form of mast arm for supporting a lamp in elevated position and spaced from a supporting structure such as a building, pole, tower or the like.

An object of the invention is to support an electrically energized lamp adapted to be lowered when maintenance or repair of the lamp is necessary. Such lamps are generally lowered by means of a cable, chain or other flexible tension member, and our improved mast arm provides both support and protection for the lamp lowering cable and for the electrical wires which energize the lamp.

Another novel feature of our invention is the provision of structures which are adaptable for mounting on various types of supports and in various positions and providing for easily adjustable lengths for the lamp supporting arm, to the end that the lamps may be mounted in a very great number of different positions with a minimum number of parts.

Other objects of the invention include the provision of novel structures for separating the lamp lowering cable and the electrical conductors throughout their lengths, novel structures for supporting cable pulleys and for providing access thereto, and other novel features which will be more apparent from the accompanying drawings and description.

In the drawings:

Fig. 1 is a side elevational view of one form of our device;

Fig. 2 is an enlarged central vertical section through the supported end of the device of Fig. 1;

Fig. 3 is an end elevational view of the device of Fig. 2 taken along the line 3—3 thereof;

Fig. 4 is a transverse vertical section taken along the line 4—4 of Fig. 2;

Fig. 5 is a transverse sectional view taken along the line 5—5 of Fig. 2;

Fig. 6 is a fragmental horizontal section taken along the line 6—6 of Fig. 2;

Fig. 9 is a transverse sectional view taken along the line 9—9 of Fig. 7;

Fig. 10 is a central longitudinal section through a modified form of our device;

Fig. 11 is a horizontal sectional view taken along the line 11—11 of Fig. 10;

Fig. 12 is a transverse sectional view taken along the line 12—12 of Fig. 10;

Fig. 13 shows a modification of the fitting appearing at the right-hand side of Fig. 10 and adapted for mounting on a different type of supporting surface;

Fig. 16 is a view somewhat similar to Fig. 14 but showing the device modified for mounting our device in the mid-portion of a pole, the same being a plan view looking downward on the device of Fig. 17;

Fig. 17 is a sectional view taken along the line 17—17 of Fig. 16;

Fig. 18 is a central longitudinal section through a modification of our device formed of castings, the plane of the view being indicated by the line 18—18 of Fig. 19;

Fig. 19 is a top plan view of the device of Fig. 18;

Figs. 20 and 21 are enlarged sectional views taken along similarly numbered lines of Fig. 18;

Fig. 22 is an enlarged sectional view of an intermediate portion of the mast arm of Fig. 18 showing a modified mounting of a cable pulley;

Fig. 23 is a transverse sectional view of the same taken along the line 23—23 of Fig. 22;

Fig. 24 is an enlarged fragmental section located at an intermediate point of a tubular mast arm such as that shown in Fig. 1, the same being taken along a vertical diameter of the tube showing a modified form of cable pulley mounting; while Fig. 25 is a transverse sectional view of the same taken along the line 25—25 of Fig. 24.

Figure 7:
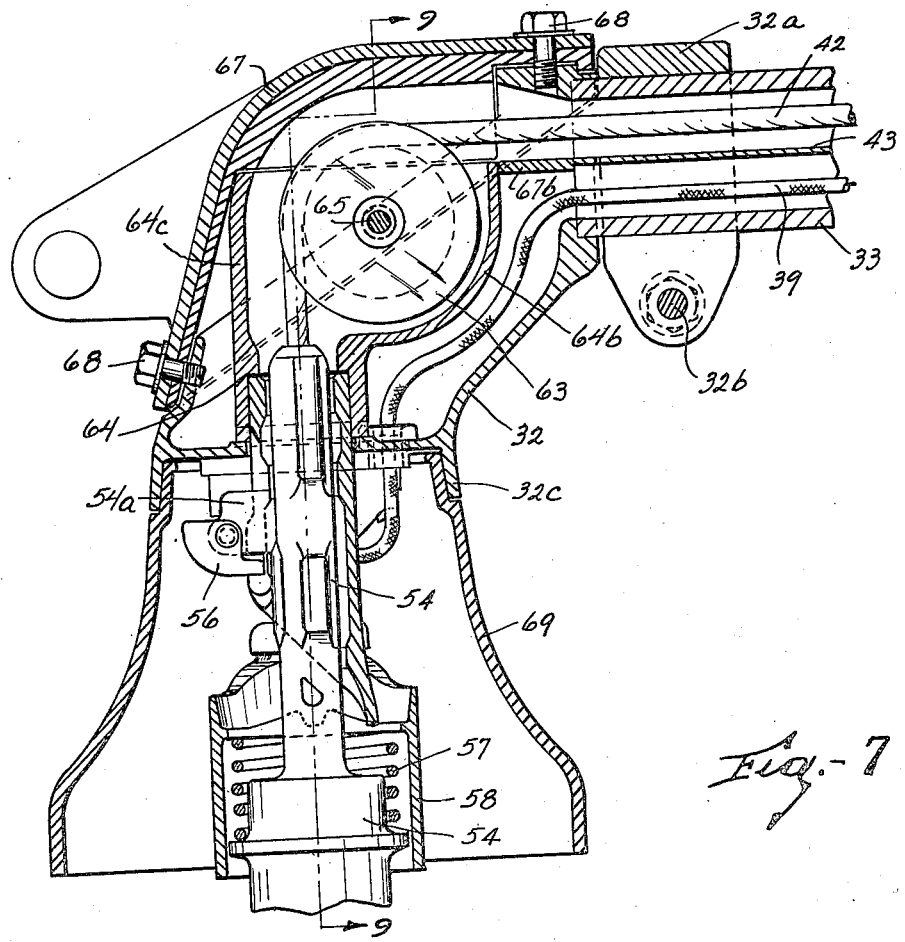
Fig. 7 is a central vertical section through the lamp supporting fixture shown at the left-hand side of Fig. 1.
Figure 8:
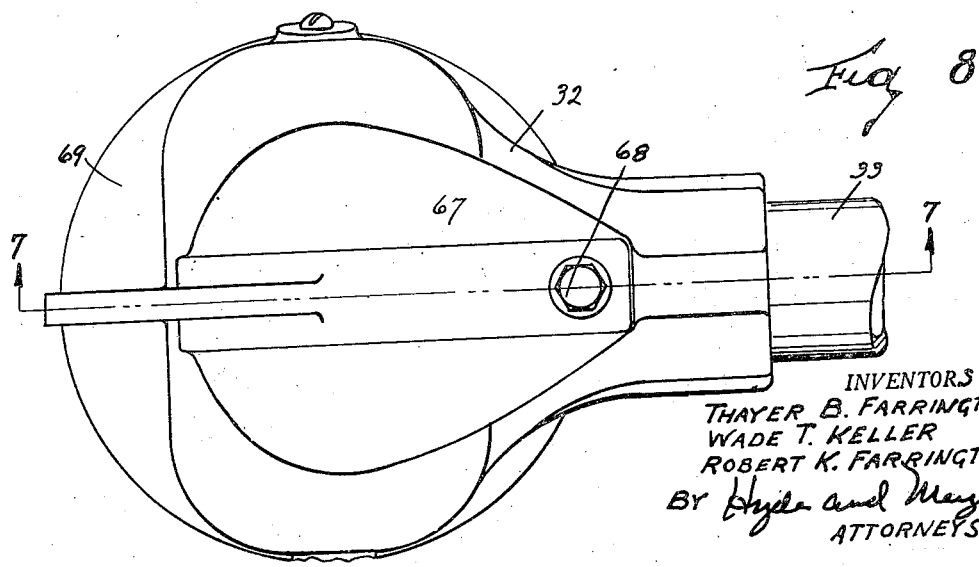
Fig. 8 is a top plan view of the same.

In the form of our device shown in Fig. 1, a fitting 30 is provided at the supporting end of the mast arm for attachment to a supporting surface 31, which may be a building, a stack, a tower, a pole or other suitable means of support. For conciseness we shall hereafter refer to this as the "pole" fitting without intending thereby to limit the type of supporting surface to which it is attached. Another fitting 32 is provided at the free end of the mast arm for the purpose of supporting an electrically energized lamp 53a which is adapted to be lowered for maintenance and repair purposes. These fittings 30 and 32 are provided with suitable clamping ends 30a and 32a, respectively, in which is clamped or otherwise secured the tubular mast arm 33. Obviously, the ends of the tube 33 might be secured to the annular rings 30a and 32a which embrace its ends by bolts, rivets or welded joints, but we find it advantageous in many cases to squeeze the rings 30a and 32a tightly upon the ends of the tube 33 by means of the clamp bolts 30b and 32b respectively. With this type of construction the customer can buy standard fittings 30 and 32 and assorted lengths of the tubular arm 33, or he might cut arms 33 to suit himself on the job. Also, the tubular arm clamping devices of Fig. 1 permit the disassembly of our apparatus in one location and reassembly with a different length of tubular arm 33 in a different location when necessary or desirable.

The details of the fitting 30 will be best seen in Figs. 3, 4, 5 and 6. Fig. 3 is a view taken at the right-hand end of Fig. 2 looking toward the left and shows the fitting 30 to be comprised of a main housing 34 having a generally horizontal bottom wall 34a and upwardly extending side wall portions 34b which merge into a generally cylindrical side and top wall 34c through which is provided at the top an opening 34d for access, the latter being covered by an arcuate cover 35 which is secured to the main housing by the screws 36. The main housing also has a wall 34e on the side toward the supporting surface 31, and through this wall is an opening 34b for access to the interior, the closure for which will be later described. In suitable locations near the upper right-hand corner of the main housing 34 as viewed in Fig. 2 are provided knock-out portions 37 for the introduction of electrical conductors. The portion in the wall 34e is shown as broken away, permitting the entrance of conduit 38 through which are led conductors 39 and 40.

A pulley 41 is mounted in housing 34 to receive cable 42 by which is raised or lowered the lamp supported by the fixture 32. This may also be a suitable chain or other flexible tention member but for briefness in the description we shall hereafter refer to it as a cable. It will be noted in Fig. 5 that the tubular arm 33 is provided with a longitudinally extending partition throughout its length which separates the cable 42 from the electrical conductors 39 and 40. In the form here shown a plate 43 extends horizontally on the diameter of tube 33, this plate being provided with flange edges 43a which are welded or otherwise suitably secured to the inner surface of the tube 33. The cable 42 passes through the upper passageway of tube 33 around pulley 41 and then downwardly through an opening 44 in the bottom wall 34a of the housing. Preferably, the downwardly extending end of the cable is housed in a conduit 45, which conduit is here shown as having a threaded connection with an annular fitting 46 which in turn has a flange 46a resting on the inner surface of the bottom wall 34a around the opening 44. It will be noted from Fig. 2 that the coacting surfaces on wall 34a and flange 46a at this point are formed arcuately in a plane at right angles to the supporting surface 31, thus permitting slight oscillation of conduit 45 and fitting 46 to the right or left as viewed in Fig. 2. This is advantageous where the supporting surface 31 is inclined, as, for instance, in the case of a stack. The conduit 45 may then lie parallel to the face of the stack and the fitting 46 adjusts itself accordingly in the housing 34.

Novel means is provided for supporting the pulley 41 from the housing 34. This comprises a bracket 47 having an outwardly extending flange 47a at its rear face adapted to overlie the opening 34f in the rear wall 34e of the housing 34. Ears are provided on the flange 47a through which securing screws 48 pass for the purpose of holding the bracket 47 in position in the housing. The bracket has a forwardly extending bottom wall 47b provided with a suitable opening 47c through which passes cable 42. The wall 47b at its forward end curves upwardly, providing a front wall 47d which rises to about the level of the partition 43 in the arm 33. Parallel side walls 47e extend from front to rear of the fitting 47, the same being integral with the walls 47b and 47d. A shaft 49 has its ends suitably supported in the side walls 47e for rotatably supporting the pulley 41 in the bracket 47.

The pulley 41 is partially shrouded by the bracket 47 just described and this shrouding is completed by the small shroud member 50 which is rigidly supported from the cover 35 and, as here shown, may be made integral therewith. To this end a web 35a extends downwardly from the top central portion of the cover 35 and supports the shroud member 50. It results from this construction that by removal of the screws 36 the cover 35 may be removed, at the same time moving the shroud portion 50 so as to uncover pulley 41 and the cable 42. This is desirable for access to the pulley and cable. Also, by removal of the screws 48 the entire pulley and its shrouding may be removed from housing 34. When the parts are in the position of Fig. 2, however, the electrical conductors 39 and 40 may pass around either or opposite sides of the bracket 47 and into the lower passageway of arm 33 without danger of contact with the moving cable or pulley.

It will be noted in Fig. 2 that the housing 34 is provided with inwardly projecting lips 51 which form substantially continuous extensions of the upper walls of tube 33 and the partition wall 43 so as to enclose the cable 42 from the time it leaves the pulley shrouding until it enters the arm 33. This avoids any possibility of the conductors 39 and 40 coming in contact with cable 42.

The rear end of housing 34 is integral with a generally triangular shape mounting flange 34g through which pass three bolts 52 by which the device is mounted on the supporting surface 31.

While our improved mast arm is useful for the support of any lowering device which is electrically energized, we have chosen to illustrate the same for the suspension of a lamp fixture of the general type shown in Patent 2,303,626, granted December 1, 1942, to Thayer B. Farrington. Referring to Figs. 7 and 9, it will be noted that the fixture which directly supports the lamp is indicated at 53, the same being analogous to the adapter 34 of the above mentioned Farrington patent. This adapter carries at its upper end a stem 54 which is automatically positioned in a guide 55 which is supported from the fitting 32. It will be noted in Fig. 9 that cable 42 passes downwardly through the hollow stem 54 and the end of the cable is suitably secured, as for instance by the two dished washers 42a held on the end of the cable and lying within the enlarged lower end of the stem. A dog 56 pivotally mounted on the fin 54a of stem 54 locks the lamp in raised position where the parts are yieldably maintained by the spring 57. The lamp is lowered by pulling on cable 42 until dog 56 is released, after which the lamp is rapidly lowered. A sleeve 58 is part of the lowering hanger member and is provided with two arms 58a, each of which supports an electrical contact 59. These contacts are electrically connected with conductors 60 which lead downwardly through the fitting 53 to the lamp to be energized. When the parts are in the position of Fig. 9 the contacts 59 mate with fixed contacts 61 which are supported in fixed position by the fixture 32. The electrical conductors 39 and 40 previously mentioned, after passing through tubular arm 33 and fixture 32, are electrically connected to the contacts 61. Thus, when the parts are in the position of Fig. 9 the electrical conductors 39, 40 supply energy to the lamp supported by the fixture 53. It should be understood here without further description that the stem 54, guide 55, sleeve 58 and contacts 59 and 61 are all similar to the parts shown and described in the above named Farrington patent, and these parts all function in the same manner as described in said patent. The stem and guide are of the slightly modified form shown in the copending patent application of Thayer B. Farrington, Robert K. Farrington and Wade T. Keller, Serial No. 520,004, filed January 28, 1944, for Lamp hanger stem and guide.

It is clearly seen in Figs. 7 and 9 that a pulley 63 is mounted in fitting 32 so as to bend cable 42 90° as it passes out of the tubular arm 33 for its attachment to the stem 54. The means for mounting this pulley in the fitting or housing 32 comprises a bracket 64 having substantially parallel side walls 64a and a combined bottom and side wall 64b, plus a rear wall 64c which provides a majority of the necessary shrouding for the pulley 63. The walls 64a rotatably support the shaft 65 on which pulley 63 is mounted. The walls 64a also extend downwardly and are provided with outwardly extending flanges 64d by which the bracket is held in place in the fitting 32. It will be noted that this fitting has a bottom web 32d having a suitable opening for receiving the stem and guide, and openings also for receiving screws 66 which pass through guide 55, wall 32d and flanges 64d to hold these parts together.

It will be noted in the various views that the fitting 32 is open at the top, this opening being closed by a cap-like closure member 67, the lower ends of which overlap the main portion of the fitting, as best seen in Figs. 7 and 9, so as to prevent the entrance of rain at this point. This cap is held in position by cap screws 68. The shrouding of pulley 63 is completed on the upper side thereof by means of substantially parallel downwardly extending flanges 67a. It results from this construction that when screws 68 are loosened the cap 67 may be removed, thus also uncovering the upper portion of pulley 63, giving access to the pulley and cable. The cap 67 also carries a web 67b at about the level of the partition wall 43 in the arm 33 so as to provide substantially a continuation of the partition from the end of arm 33 to the wall 64b. It results from the construction just described that cable 42 is completely separated from the electrical conductors 39 and 40 in their passageway through the fitting 32. It will be noted from Figs. 7 and 9 that the fitting 32 is generally of elbow form with the electrical conductors located near the inside of the eblow and with cable 42 located generally on the outside of the elbow.

Fitting 32 is provided with flanges 32c which extend downwardly below the partition 32a to overlap and support canopy 69 which surrounds and protects the separable contacts in the same manner as canopy 13 of the above mentioned Farrington patent. Here, however, the partition 32a forms the top of the canopy and the flanges 32c overlap the canopy skirt on the outside thereof so as to prevent the entrance of moisture at this point.

It should be obvious from the above description that an operator standing at some level well below the mast arm 33 may manipulate cable 42 so as to lower the lamp suspended from the fitting 53 for repairs or maintenance with assurance that the electrical connections are safe from damage all the way from conduit 38 to the contacts 61. At no point can the moving pulleys or cable come in contact with the electrical conductors.

In the modification shown in Figs. 10 to 13 inclusive, an arrangement similar to that just described is shown and therefore the differences only will be described, it being understood that all other parts given similar reference characters have functions like those already described.

Here the tubular arm 33 extends outwardly and upwardly from the supporting surface at an angle of approximately 30° to the horizontal. Obviously this angle may be made to suit the conditions. The housing 70 comprises a rear mounting flange 70a suitably bolted to an adapter fitting 71 which is here arranged for mounting on a hollow cylindrical pole 72. The pole 72 is provided with opening 72a, and the fitting 71 and the mounting flange 70a are provided with alined openings so as to give access for the cable 42 to pass to the interior of the pole 72. Here the means for mounting pulley 73 in the housing 70 comprises a bracket 74 having parallel side walls 74a which are integrally joined by front wall 74b and a combined top and rear wall 74c. Two ears 74d extend laterally outwardly from the walls 74a in opposite directions so as to overlap the sides of the opening in the flange 70a. These ears are secured to the flange 70a by screws 75. The shaft 76 supporting pulley 73 is rotatably mounted in the walls 74a. Thus, by removal of screws 75 the pulley and its shrouding may be completely removed from the housing 70. Suitable openings are provided in housing 70 with insulating bushings 77 for the reception of electrical conductors 39 and 40. These conductors pass through housing 70 and into the lower passageway in tube 33. Here, as before, a web 70d in housing 70 is substantially an extension of the partition wall 43 extending between the end of tube 33 and the pulley shrouding. It will be noted that the wall 74c extends to a point quite close to the upper rear portion of housing 70 so that the cable 42 is substantially enclosed at this point. In other words, it is impossible for conductors 39 and 40 to come in contact with cable 42 anywhere within the housing 70.

At the outer end of the arm the fixture 78 is in every way analogous to the fixture 32. The bracket 79 which supports and surrounds the pulley 63 is quite similar to the bracket 64 described in connection with the first modification, except that the wall 79b is of slightly different form than wall 64b because of the changed angle of the arm 33. Here, as before, the top closure cap 80 carries the parallel walls 80a which complete the shrouding of pulley 63 and which permit access to the pulley and cable when the cap 80 is removed. Also, web 80b forms an extension of the partition 43 within the fitting 70a so as to enclose the cable 42 between the end of tube 33 and the wall 79b. Thus, as before, the cable 42 and the electrical conductors 39 and 40 pass around pulleys 73 and 63 and through housing 70, arm 33 and fitting 78, keeping cable 42 and conductors 39 and 40 separated at all points so that there is no possibility of the conductors coming in contact with the moving cable or pulleys. The lowering lamp hanger electrical contacts, surrounding canopy, and all similar parts are like those described in connection with the first modification.

Fig. 13 shows a modification of the housing 70 and associated parts which have just been described. Here the housing 81 has formed integrally with it a flange 81a through which pass bolts 82 for securing the device to a supporting surface 83 which is any type of wall or solid surface as distinguished from the pole 72 of Fig. 10. In the housing 81 is mounted a bracket 84, the rear or right-hand portion of which as viewed in Fig. 13 forms a shrouding for the right-hand side of pulley 85 and a shrouding for a portion of the top of the pulley. The bracket 84 includes a pair of parallel side walls 84a positioned similarly to the walls 74a of Fig. 11 and an integral front or left-hand wall 84b which forms a shrouding for the other side of pulley 85. Shaft 86, which carries pulley 85, is rotatably mounted in the side walls 84a. The bracket has a flange 84c which overlaps the edges of a rear opening 81b of the housing 81, by means of which the bracket is secured to the housing as by screws 87 which pass through the flange 84c into the housing. Access is provided to housing 81 also through the top cover 88, which is arcuate in form, similar to the cover 35 previously described, and the same is suitably secured to the housing 81. Projections 89 extend inwardly of housing 81 on both sides of cable 42 so as to almost completely surround cable 42 between the end of tube 33 and the pulley shrouding. Conductors 39 and 40 are led into the housing 81 through conduit 38 in the same manner as described in connection with Fig. 2. These electrical conductors pass one on either side of bracket 84 and into the lower passageway of arm 33 beneath the partition wall 43. The cable 42 is above the partition wall, as clearly shown in Fig. 13. Thus, as in other forms of the device the cable and electrical conductors are separated at all points.

Leading out of housing 81 is conduit 45 and swivel fitting 46, permitting a modified ball and socket joint movement to permit conduit 45 to lie parallel to various mounting surfaces 83, as previously described in connection with Fig. 2. It should be understood that the housing 81 has substantially uninterrupted outer walls except for the openings to which attention has been called.

Figure 14:
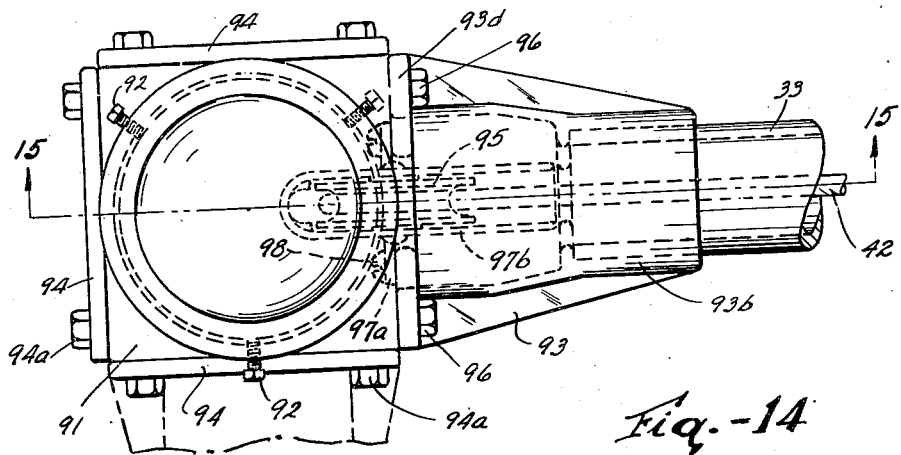
Fig. 14 is a view of a modified type of fitting for mounting our device at the top of a pole, the same being a top plan view of the device of Fig 15.
Figure 15:
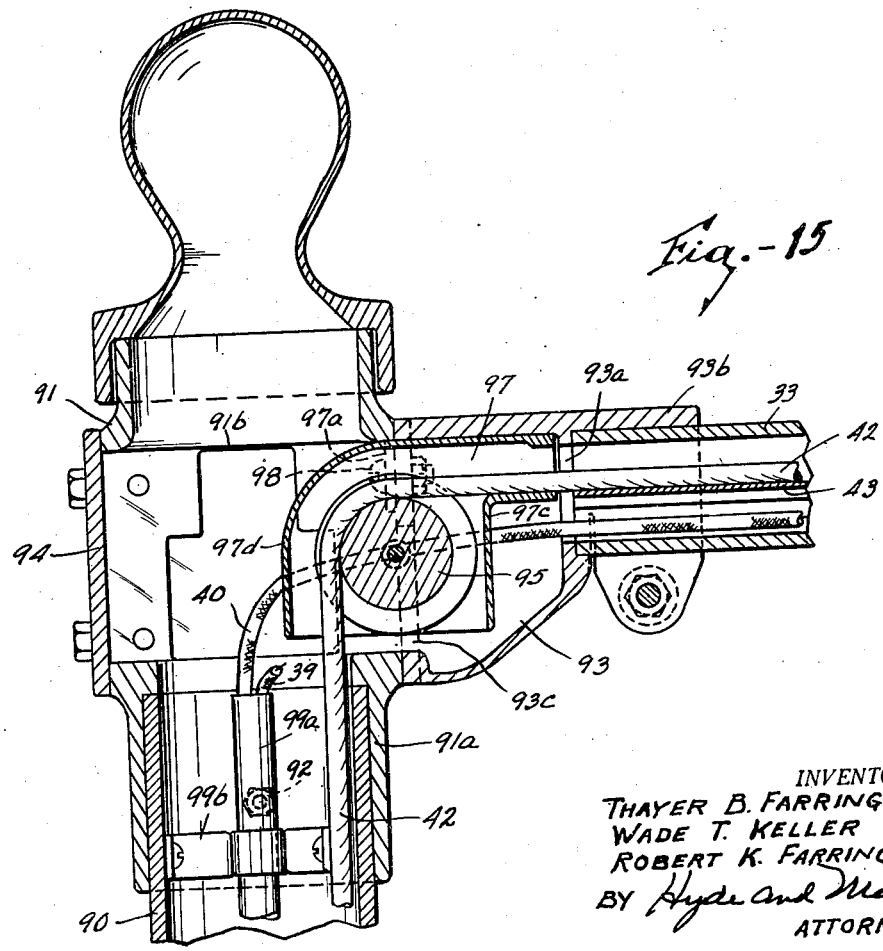
Fig. 15 is a longitudinally extending sectional view taken along the line 15—15 of Fig. 14.

In Figs. 14 and 15 we have shown another modified form of pole mounting for the fixture which supports the inner end of the mast arm 33. This fixture is designed for application at the top of a hollow pole 90 but otherwise has much in common with the devices of Figs. 10 and 13. In this modification a fitting 91, provided with a downwardly extending cylindrical sleeve 91a, fits over the top of the pole 90 and is secured thereto by a bolt or set screw 92. This fitting may be provided for the attachment of one or several fixtures like that shown at 93. In the form here shown, one fixture 93 is in place alined with an opening 91b in fitting 91 and three similar openings located 90° apart around the pole, are covered by the plates 94 which obviously may be removed for the attachment of other fittings 93, if desired.

The fitting 93 is provided with substantially uninterrupted walls on the top, bottom and sides, but is provided with an opening 93a in the right-hand wall, as viewed in Fig. 15, opposite the end of tube 33. This tube is secured in the clamping ring 93b as previously explained in connection with the clamping ring 30a of Fig. 1. There is also an opening 93c through the left-hand wall of the fitting or housing through which extends part of pulley 95 and its shrouding. Ears or flanges 93d are provided on the left-hand wall of housing 93 through which pass bolts 96. The holes to receive bolts or cap screws, such as those indicated at 96, fit in the same openings adapted to receive the threaded members 94a used to hold the plates 94 in place.

Pulley 95 is wholly supported in housing 93 by means of bracket 97. This bracket is provided with ears 97a through which pass screws 98 for securing the bracket to the housing 93. The bracket comprises parallel side walls 97b connected front and rear by transversely extending walls 97c and 97d, respectively, so that the pulley is completely shrouded on all sides except the bottom. It will be noted that the shrouding has an opening opposite the passageway in arm 33 above the partition wall 43 so that the horizontal run of the cable 42 enters tangentially of pulley 95. The shrouding 97d extends inside the hollow of pole 90 so that the vertical run of cable 42 may extend tangentially from pulley 95 down the pole to a point handy for manipulation by an operator.

In this form of the device the conductors 39 and 40 are suitably fastened inside of pole 90 as, for instance, by means of conduit 99a which is held in the pole by bracket 99b. These two conductors pass one on each side of bracket 97 and then through the lower passageway of arm 33. The shrouding extends to a point sufficiently low to insure that conductors 39 and 40 do not come in contact with the moving cable 42 or the pulley 95.

Figs. 16 and 17 show another modification similar to that just described, except that here the fitting is arranged to be secured at the mid-portion of a hollow pole 100. In this case, coacting clamping flanges 101 and 102 are clamped around pole 100 by means of bolts 103. As shown in full lines in Fig. 16, the fitting 101 is arranged so that the housing 93 may be mounted thereon by bolts 96 in the same manner as the device described in Figs. 14 and 15. The clamp 102 is substantially semi-circular and is held in place by set screw 104. As indicated in dot-dash lines at 105, at the left-hand side of Fig. 16, another fitting exactly like 101 may be bolted on that side of pole 100, if desired, so that two arms 33 may extend outwardly from the pole at the same level.

Since the bracket 97 supporting pulley 95 is almost exactly like that described in connection with Figs. 14 and 15, no further description of this form of our device is thought necessary. Similar parts have been given similar reference characters.

Another modification of our device is shown in Figs. 18 to 21. In this form of device a housing 106 is secured to a supporting structure 107 by means of bolts 108. Inside the housing is mounted a bracket 109 in which is rotatably mounted a pulley 110. The housing is closed by a bottom plate 111 through which is provided an opening 112 for the passage of cable 42. The pulley bracket 109 has an opening alined with the opening 112 and a modified ball and socket joint is provided for the cable enclosing conduit 113 for the same purpose as previous constructions of the same type described above. The means for fastening bracket 109 in place comprises ears 109a. It will be noted that the bracket 109 completely shrouds the pulley 110 except at the left-hand side thereof as viewed in Fig. 18. The protection of the cable 42 and pulley 110 at this point comprises a pair of parallel walls 114 which extend from the left-hand wall of housing 106 toward the pulley, slightly overlapping the end of bracket 109 as clearly shown in the drawings. A bottom wall or web 114a connects the side walls 114. There is an opening 115 provided in the wall of housing 106 which faces the hollow arm 116 to provide for the passage of cable 42. It will be noted that here, as in other forms of our device, a partition wall 116a divides the hollow arm 116 into upper and lower passageways. The cable 42 is in the upper passageway and the opening 115 is alined with this passageway only.

The arm 116 is here formed of a casting, thus differing from the tube 33 used in other forms of our device. This casting is provided with ears 116b at the right-hand end thereof through which pass bolts 117 to secure the arm rigidly to the housing 106. At its outer end the top wall of arm 116 ends in a flange and groove construction 118 for the reception of a closure cap 119. The bottom wall of the arm curves down as indicated at 120. The two side walls of arm 116 curve downwardly and outwardly along the line 121 and are joined together at their outermost ends by the end wall 122. Connecting the walls 120 and 122 is a web 123 having a central opening to receive later described parts. Mounted on web 123 is a pulley bracket 109' which is like the bracket 109 at the inner end of the arm and secured by ears 109a to the web 123. A pulley 124 is rotatably mounted on bracket 109'. It will be noted that the partition wall 116a turns downwardly at 116c, terminating at the level of the wall of bracket 109' directly below pulley 124. In this fashion pulley 124 is also completely shrouded.

Parts for supporting a lamp and for supplying the same with electricity are supported at the outer end of the arm 116 in the same manner and by use of the same parts as described in connection with Figs. 7 and 9. Those parts which are shown in Figs. 18 and 21 have been similarly numbered so that their function will be readily understood. The lamp supporting member 53 is carried by stem 54 to which cable 42 is attached. The latch dog 56 holds the lamp in elevated position until the same is lowered by proper manipulation of cable 42 as previously described. The stem 54 is received in the guide 55 which is rigidly attached to the web 123.

In this form of our device electricity is supplied to the lamp suspended from the member 53 by means of conductors 39 and 40, as in previously described forms of our device. These conductors enter through suitable openings in the side walls of the housing 106, as shown in the drawings. They then pass around opposite sides of bracket 109 and walls 114 into the lower passageway of arm 116. At the outer end of the arm these conductors pass through suitable openings in web 123 and are connected to the fixed contacts 61 as previously described in connection with other forms of our device.

Means is shown for supporting the outer end of arm 116 directly from structure 107 or other suitable fixed points when necessary or desirable. For instance, an ear 116d extends upwardly from the top of arm 116 at its outer end and struts 125 extend from 116d to some point on structure 107 above the housing 106 so that part of the weight of the outer end of the arm and parts suspended therefrom may be directly supported from the fixed structure 107. Obviously, this feature might be supplied in the earlier described forms of our device, if necessary.

It is sometimes desirable to extend cable 42 downwardly from the lamp supporting arm from a point nearer the lamp. In Fig. 3 of the above-mentioned Farrington patent, arm 51 might be guided on the lowering cable. To this end, in Fig. 18, at an intermediate point in the lower wall of arm 116, there is provided an opening 116e which may normally be closed by a plate 126 suitably bolted in place. If it is desirable to bring cable 42 out of the arm at this point to extend downwardly for manipulation by an operator, the structure shown in Figs. 22 and 23 may be utilized. Fig. 22 is an enlarged view of the intermediate portion of the arm 116. It will be noted that plate 126 has been removed and bracket 127 has been secured in place by bolts 128 passing through ears 127a rigid with the bracket. These bolts enter the same holes which were used to secure plate 126 in place. Pulley 129 carried by shaft 130 is rotatably mounted in the side walls of bracket 127. The partition wall 116a has an opening 116f permitting bracket 127 to extend upwardly so that cable 42 may leave the pulley 129 tangentially of the pulley in a horizontal direction and in alinement with the upper passageway of arm 116. Referring to Fig. 23 it will be clear that bracket 127 provides a shrouding on all sides of pulley 129 so that the electrical conductors passing through the lower portion of arm 116 are protected against contact with rotatable pulley 129.

Structure similar to that shown in Figs. 22 and 23 may be provided in arm 33 of previously described forms of our device, particularly that shown in Fig. 1. To utilize this improvement an opening 131 is cut through the bottom wall of arm 33 with an alined opening 132 through the partition 43. A bracket 133 is then secured to tube 33 by means of the bolts 134. This bracket comprises front and rear walls and parallel side walls 133a. Pulley 135 is carried by shaft 136 which is suitably mounted in the walls 133a. Here again, as in the device described in the preceding paragraph, the electrical conductors in the lower passageway of arm 33 are fully protected against contact with the pulley 135.

We call attention to the fact that housing 34 of Fig. 2, housing 81 of Fig. 13, and housing 106 of Fig. 18, show three different forms of a combined junction box and arm supporting fixture. Each of these provides means for receiving wiring in conduit where necessary or desirable, and from these points the electrical wiring may be run out through the lamp supporting arm. At the same time the junction box structure is so formed as to provide a rigid support for the lamp mast arm 33 or 116 and also for supporting suitable pulleys for changing the direction of cable 42.

What we claim is:

1. In combination, a hollow arm having one end connected to a fixed support, said arm extending laterally outwardly from said support, an electrical device detachably mounted at the other end of said arm, a housing at one of the ends of said arm, a pulley rotatably mounted within said housing, partition means dividing the hollow of said arm into two separate passageways extending longitudinally through said arm, shrouding means for said pulley substantially completely surrounding said pulley within said housing, there being two openings provided in said shrouding means for the passage of a flexible member around said pulley, one of said openings communicating with one of said passageways in said hollow arm, there being an opening in said housing outside of said shrouding means and communicating with the other of said passageways in said arm, a flexible tension member connected with said electrical device for raising and lowering the latter, said tension member passing through said one of said passageways in said arm and passing, by way of said two openings in said shrouding means, around said pulley and out of said housing, and electrical conductors for said device passing through the other passageway of said arm and through said housing outside of said shrouding means, whereby said conductors are protected against contact with said pulley and cable.

2. The combination of claim 1 wherein there is provided an opening through a wall of said housing for access inside thereof, a closure member for said last named opening, and a portion of said shrouding means carried by said closure member and adapted to pass through said last named opening, whereby removal of said closure member also removes said portion of said shrouding means providing access to said pulley also.

3. The combination of claim 1, wherein there is provided an opening through a wall of said housing for access inside thereof, said opening being at least as large as the projected area of said pulley, a closure member for said last named opening, and mounting means for said pulley carried by said closure member and adapted to pass through said last named opening, whereby said pulley and its mounting means may be removed by removal of said closure member.

4. In combination, a hollow arm having one end fixed to a supporting structure, said arm extending laterally outwardly from said structure, an electrical device detachably mounted at the outer end of said arm, partition means dividing the hollow of said arm into two separate passageways extending longitudinally through said arm, a flexible tension member passing through one of said passageways and connected with said device for raising and lowering the same, electrical conductors for energizing said device passing through the other of said passageways, there being an opening through a wall of said arm at a point spaced from said supporting structure, a closure member for said opening, and a pulley for said tension member carried by said closure member and positioned to receive said tension member from said one passageway when said closure member is in closed position, there being an opening through said closure member for passage of said tension member from said pulley to the outside.

5. In combination, a hollow arm having one end fixed to a supporting structure, said arm extending laterally outwardly from said structure, an electrical device detachably mounted at the outer end of said arm, partition means dividing the hollow of said arm into two separate passageways extending longitudinally through said arm one above the other, a flexible tension member passing through the upper of said passageways and connected with said device for raising and lowering the same, electrical conductors for energizing said device passing through the lower of said passageways, there being registering openings through said partition means and through the lower wall of said arm, a closure member for said opening in the wall of said arm, a pulley for said tension member carried by said closure member and extending into said upper passageway to receive said tension member when said closure member is in closed position, and shrouding for said pulley carried by said closure member and adapted to pass through said lower passageway, said shrouding preventing contact between said conductors in said lower passageway and said pulley, there being an opening through said closure member inside said shrouding for passage of said tension member from said pulley to the outside.

6. The combination of claim 1 wherein said fixed support comprises a hollow pole having its base supported in the ground or other structure, said housing being at the pole-supported end of said arm, means securing said housing to said pole, and said pulley and shrouding means extending partially into the hollow of said pole, whereby said flexible tension member after leaving said pulley may pass through the hollow of said pole.

7. In the combination of a hollow arm fixed to a housing support and having a fixture at the free end of said arm manipulatable by means of a flexible tension member passing through said arm and housing support, there being a pulley rotatably mounted in said support and over which said tension member passes, the provision of a conduit extending from said housing support substantially tangential to said pulley and embracing said cable, there being an opening through said support through which passes an end of said conduit, and a collar on said conduit end inside of said housing support and overlying said opening, said collar and contiguous support being formed to permit limited oscillation of said conduit in said opening, whereby various positions of said conduit may lead said tension member substantially tangentially to said pulley.

THAYER B. FARRINGTON.
WADE T. KELLER.
ROBERT K. FARRINGTON.